United States Patent
Otsuki et al.

[15] 3,674,651
[45] July 4, 1972

[54] POLYMERIZATION INHIBITION OF ACRYLIC ACID

[72] Inventors: Susumu Otsuki; Kyoichi Hori; Isao Miyanohara, all of 4560, Oaza-Tonda, Nanyo-cho, Tsuno-gun, Yamaguchi, Japan

[22] Filed: June 10, 1970

[21] Appl. No.: 45,213

[30] Foreign Application Priority Data

June 10, 1969 Japan..................................44/45613
June 24, 1969 Japan..................................44/49888

[52] U.S. Cl.....................................203/8, 203/49, 203/59, 203/91, 260/526 N
[51] Int. Cl......................................C07c 57/04, B01d 3/34
[58] Field of Search.........................203/8, 9, 59; 260/526 N

[56] References Cited

UNITED STATES PATENTS

| | | | |
|---|---|---|---|
| 2,388,041 | 10/1945 | Craig | 203/9 |
| 2,399,340 | 4/1946 | Franz | 203/9 |
| 2,863,851 | 12/1958 | O'Brien | 260/526 N |
| 3,239,433 | 3/1966 | Costolow | 203/8 |
| 3,366,702 | 1/1968 | Moriarty | 260/679 |
| 3,433,831 | 3/1969 | Yomiyama et al. | 203/8 |
| 3,527,677 | 9/1970 | Harping | 203/8 |

Primary Examiner—Wilbur L. Bascomb, Jr.
Attorney—Sughrue, Rothwell, Mion, Zinn and Macpeak

[57] ABSTRACT

The inhibition of the polymerization of acrylic acid and a process for stabilizing the distillation of acrylic acid using a combination of a polymerization inhibitor, such as diphenylamine or its derivatives, and an oxygen-containing gas, or mixtures of polymerization inhibitors, such as diphenylamine or its derivatives, with benzoquinone and/or hydroquinone mono-methyl-ether, and an oxygen-containing gas are disclosed.

11 Claims, 1 Drawing Figure

PATENTED JUL 4 1972
3,674,651
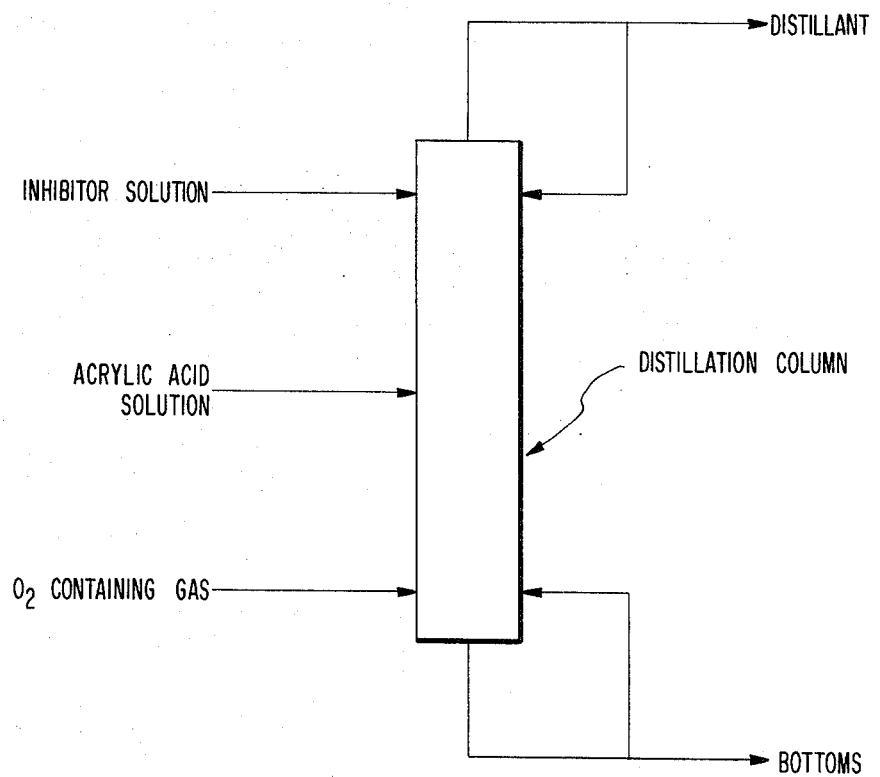

3,674,651

POLYMERIZATION INHIBITION OF ACRYLIC ACID

BACKGROUND OF THE INVENTION

1. Field of the Invention

The present invention relates to a process for inhibiting the polymerization of acrylic acid. This invention is particularly useful for preventing the polymerization of acrylic acid on distillation of acrylic acid. Accordingly, this invention also relates to a process for stabilizing the distillation of acrylic acid.

2. Description of the Prior Art

Distillations are widely employed in processes for preparing acrylic acid and are particularly employed in the concentration and purification of acrylic acid. It is widely known that acrylic acid is easily polymerized on heating, but heating is more or less necessary in distillation and a device for inhibiting the polymerization is variously considered.

But, in using well-known polymerization inhibitors, for example, hydroquinone, phenothiazine, catechol, methylene-blue or the like, polymerization is easily accomplished in gaseous phase (mainly inside the column wall, on the reverse side of plates and on the external surface of overflow pipes) in comparison with the liquid phase. This polymer grows quickly and is essentially insoluble in all solvents. Blockage of a column may occur in a short time and thereby continuous operation becomes impossible. In other words, it can be said in the distillation of acrylic acid that the polymerization inhibitor in the gaseous phase determines the stability of the distillation.

Hitherto, polymerization inhibitors for acrylic acid at low temperatures or polymerization inhibitors used in liquid phase are numerous and known. But polymerization of acrylic acid depends greatly upon the temperature employed and if the temperature exceeds the range of 60° to 70° C, its polymerization velocity is increased exponentially with respect to the temperature. Usually, distillation is carried out under a reduced pressure for decreasing the temperature but a pressure variation is caused in rectification trays and an increase of the temperature can not be avoided in the low portion of the column. Further, the temperature at the top of the column is limited primarily due to condensation point of the distilled material, so that distillation at a low temperature is almost impossible. Where a high temperature is used, the concentration of the polymerization inhibitor, as a matter of course, must be kept at a high degree. In using well-known polymerization inhibitors and thereby inhibiting polymerization in the gaseous phase in the distillation column, the amount necessary is very large in major cases and this is not practical.

Research on numerous materials by various and different experiments, giving priority to a polymerization inhibitor, particularly in the gaseous phase, were carried out resulting in the discovery of a very effective process for polymerization inhibition, as disclosed in Japanese Pat. application No. 4645/69. Furthermore, repeated research resulted in the discovery of a superior and more effective process of polymerization inhibition which is also applicable at a high temperature.

SUMMARY OF THE INVENTION

The present invention relates to a process which comprises feeding diphenylamine or its derivatives into a distillation column at the top and further supply air or oxygen into the column from the bottom or to a process which comprises feeding a solution containing diphenylamine or its derivatives, and benzoquinone or hydroquinone-mono-methyl-ether at the top of the column and further supplying air or oxygen at the bottom of the column. This process can stabilize the distillation of liquid acrylic acid. Further it involves an additional procedure which comprises the addition of a general polymerization inhibitor, which is an effective inhibitor in the liquid phase, and furthermore increases its stabilization.

BRIEF DESCRIPTION OF THE DRAWING

In the accompanying schematic drawing, there is shown diagrammatically and merely for the sake of illustration an apparatus which can be used for carrying out the process of this invention.

DETAILED DESCRIPTION OF THE INVENTION

As was described hereinbefore, polymerization velocity is greatly affected by the operating temperature, so that the feed rate of the polymerization inhibitor is determined by the operating temperature. The feed rate of the diphenylamine or its derivatives is preferably in the range from 50 to 5,000 ppm, in proportion to the weight of liquid in the column, or the feed rate of the solution of diphenylamine or its derivatives and hydroquinone or hydroquinone-mono-methyl-ether is preferably in the range of from 50 to 5,000 ppm, in proportion to the weight of liquid in the column. The concentration of the air (or oxygen is in the range of from 0.1 to 10 percent (or 0.02 to 2 percent in the case of oxygen) in proportion to the volume of vapor in the column. The following examples are given to illustrate further the present invention, but these examples are not to be interpreted as limiting the present invention.

NOTE: Hereinafter the percentage figure in the bracket is the percentage figure for oxygen.

COMPARISON EXAMPLE I

Ten g of purified acrylic acid and a polymerization inhibitor were added to a test tube and the test tube was placed in an oil bath at 105° C and the time of polymerization inhibition was measured.

There results obtained are shown in Table I.

TABLE I

| Polymerization inhibitor | Concentration (weight percent) | Time before polymer deposition (hour) |
| --- | --- | --- |
| No inhibitor | | 1 |
| Hydroquinone | 0.03 | ¹ 30 |
| Phenothiazine | 0.03 | ¹ 30 |
| Diphenyl para-phenylene diamine | 0.03 | 9 |
| Reaction product of diphenylamine and acetone | 0.03 | ¹ 30 |
| Benzoquinone | 0.03 | 5 |
| Hydroquinone monomethyl ether | 0.03 | ¹ 30 |
| Diphenylamine | 0.03 | 17 |

¹ Or more.

COMPARISON EXAMPLE II

One hundred g of purified acrylic acid and a polymerization inhibitor were added to a flask with a total reflux condenser. The flask was placed in an oil bath at 105° C and a boiling test was carried out under a pressure of 170 mm Hg. These tests were repeated several times and the average values of the test results obtained are shown in Table II.

TABLE II

| Polymerization inhibitor | Inhibitor concentration (weight percent) | Time before polymer deposition |
| --- | --- | --- |
| No inhibitor | | 0.5 |
| Hydroquinone | 0.3 | 0.7 |
| Phenothiazine | 0.3 | 1.5 |
| Diphenylamine | 0.3 | 1.0 |
| Diphenyl para-phenylene diamine | 0.3 | 0.8 |
| Reaction product of diphenylamine and acetone | 0.3 | 0.8 |
| Benzoquinone | 0.3 | 7.0 |
| Hydroquinone monomethyl ether | 0.3 | 0.7 |

In all cases, polymerization was carried out in the gaseous phase and these figures compare with the results obtained in Comparison Example I. They show that polymerization occurred in a very short time in spite of the high concentration of polymerization inhibitor in the liquid.

EXAMPLE I

In the same manner as used in Comparison Example II, a reaction system was prepared and then, oxygen was absorbed by the system, at a level of one percent by volume in proportion to the amount of vapor. The tests were carried out by the same procedure used in Comparison Example II. The results obtained are shown in Table III

TABLE III

| Polymerization inhibitor | Inhibitor concentration (weight percent) | Time before polymer deposition |
|---|---|---|
| Process of comparison example I: | | |
| No inhibitor | | 1.5 |
| Hydroquinone | 0.3 | 2 |
| Phenothiazine | 0.3 | 1.5 |
| Benzoquinone | 0.3 | 4 |
| Hydroquinone monomethyl ether | 0.3 | 4 |
| Process of present invention: | | |
| Diphenylamine | 0.3 | 6 |
| N-methyl diphenyl amine | 0.3 | 6 |
| o-Chlorophenyl-N-aniline | 0.3 | 6 |
| o-Methylphenyl-N-aniline | 0.3 | 5 |
| Diphenyl-para-phenylene diamine | 0.3 | 5 |
| Reaction product of diphenyl amine and acetone | 0.3 | 6 |
| Diphenylamine and benzoquinone | 0.15-0.15 | 7 |
| Diphenylamine and hydroquinone monomethyl ether | 0.15-0.15 | 7 |

In the above cases, polymerization was also carried out in the gaseous phase and the results in Table III in comparison with the results in Table II manifestly showed that the material used in the present invention in combination with oxygen showed great synergism.

EXAMPLE II

Purified acrylic acid was charged in a column of 50 mm inside diameter equipped with five porous plates. The acrylic acid was refluxed totally under an operating pressure of 160 to 170 mm Hg, at a bottom temperature of 120° to 130° C and a column inside temperature 95° to 100° C. A polymerization inhibitor was added to the column from the top of the column in an acrylic acid solution and air (or oxygen) was fed into the column at the bottom.

The results obtained with the polymerization inhibitors are shown in Table IV.

polymerization would normally occur. One embodiment in which the polymerization inhibition of acrylic acid is desired is the distillation of acrylic acid. By this invention acrylic acid can be distilled, for example, in a column in which the temperature and pressure of the top of the column range from 39° to 95° C and from 10 to 150 mm Hg, respectively, in the presence of a polymerization inhibitor, e.g., diphenylamine and its derivatives, or a mixture of polymerization inhibitors of this invention, e.g., diphenylamine and its derivatives and benzoquinone or hydroquinone monomethyl ether (as disclosed hereinbefore), at a level of from 50 to 5,000 ppm by weight based on the amount of acrylic acid in the liquid phase, with oxygen or an oxygen-containing gas at a level such that the oxygen present ranges from 0.02 to 2 percent by weight based on the amount of acrylic acid in the vapor phase. In one embodiment of the distillation, the distillation is by introducing the acrylic acid containing the polymerization inhibitor at the top of the distillation column and feeding oxygen or an oxygen-containing gas into the bottom of the distillation column.

What is claimed is:

1. A process for inhibiting the polymerization of acrylic acid which comprises treating said acid with the combination of (1) at least one member selected from the group consisting of (a) a compound having the general formula:

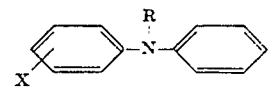

wherein X is selected from the group consisting of a hydrogen atom, a halogen atom, an alkyl group and a phenylamino group and wherein R is selected from the group consisting of a hydrogen atom and an alkyl group, and (b) the reaction product of diphenylamine and acetone, and (2) a gas selected from the group consisting of oxygen and an oxygen-containing gas.

2. The process of claim 1, wherein the concentration of the member is from 50 to 5,000 ppm by weight to acrylic acid liquid, and the concentration of the gas is such that the concentration of the oxygen present ranges from 0.02 to 2 percent by volume to acrylic acid vapor.

| Polymerization inhibitor | Inhibitor concentration (w./w. total weight of solution) | Concentration of air or oxygen (v./v. total vapor volume) | Time before polymerization deposition (hour) |
|---|---|---|---|
| Process of the comparison example: | | | |
| No inhibitor | | Oxygen (1) | 3. |
| Hydroquinone | 0.3 | do | 5. |
| Diphenylamine | 0.1 | Air (5) | 20. |
| Benzoquinone | 0.1 | Oxygen (0.5) | 8. |
| Hydroquinone monomethyl ether | 0.1 | Air (2.5) | 10. |
| Process of the present invention: | | | |
| Diphenylamine | 0.3 | Oxygen (1) | 30 or more. |
| Hydroquinone | 0.02 | | |
| N-methyl diphenylamine | 0.3 | Air (5) | Do. |
| Hydroquinone | 0.02 | | |
| o-Chlorophenyl-N-aniline | 0.3 | Oxygen (1) | Do. |
| o-Methylphenyl-N-aniline | 0.3 | Air (5) | Do. |
| Reaction product of diphenylamine and acetone | 0.3 | Oxygen (1) | Do. |
| Diphenyl para-phenylene diamine | 0.3 | Air (5) | Do. |
| Reaction product of diphenylamine and acetone | 0.05 | Air (2.5) | 30. |
| Benzoquinone | 0.05 | | |
| Diphenylamine | 0.05 | Oxygen (0.5) | 30 or more. |
| Benzoquinone | 0.05 | | |
| N-methyl diphenylamine | 0.05 | Air (3) | Do. |
| Benzoquinone | 0.05 | | |
| o-Methylphenyl-N-aniline | 0.05 | Air (3) | Do. |
| Benzoquinone | 0.05 | | |
| o-Chlorophenyl-N-aniline | 0.05 | Air (3) | Do. |
| Benzoquinone | 0.05 | | |
| Diphenylamine | 0.05 | Air (3) | Do. |
| Hydroquinone monomethyl ether | 0.05 | | |
| Reaction product of diphenylamine and acetone | 0.05 | Air (3) | Do. |
| Hydroquinone monomethyl ether | 0.05 | | |

The examples given hereinbefore, in which acrylic acid was refluxed at elevated temperatures with a markedly increased time for polymerization, show that the polymerization of acrylic acid can be minimized under conditions in which 3. A process for inhibiting the polymerization of acrylic acid which comprises treating said acid with the combination of (1) a mixture of at least one member selected from the group consisting of (a) a compound having the general formula:

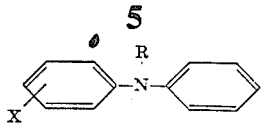

wherein X is selected from the group consisting of a hydrogen atom, a halogen atom, an alkyl group and a phenylamino group and wherein R is selected from the group consisting of a hydrogen atom and an alkyl group, and (b) the reaction product of diphenylamine and acetone, and at least one compound selected from the group consisting of benzoquinone and hydroquinone monomethyl ether, and (2) a gas selected from the group consisting of oxygen and an oxygen-containing gas.

4. The process of claim 3, wherein the concentration of the mixture is from 50 to 5,000 ppm by weight to the acrylic acid liquid and the concentration of the gas is such that the concentration of the oxygen present ranges from 0.02 to 2 percent by volume to acrylic acid vapor.

5. The process of claim 2, wherein said oxygen-containing gas is air.

6. The process of claim 4, wherein said oxygen-containing gas is air.

7. A process for stabilizing the distillation of acrylic acid which comprises treating said acid with the combination of (1) at least one member selected from the group consisting of (a) a compound having the general formula:

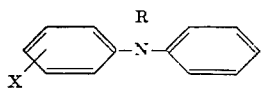

wherein X is selected from the group consisting of a hydrogen atom, a halogen atom, an alkyl group and a phenylamino group and wherein R is selected from the group consisting of a hydrogen atom and an alkyl group, and (b) the reaction product of diphenylamine and acetone, and (2) a gas selected from the group consisting of oxygen and an oxygen-containing gas.

8. A process for stabilizing the distillation of acrylic acid which comprises treating said acid with (1) a mixture of at least one member selected from the group consisting of (a) a compound having the general formula:

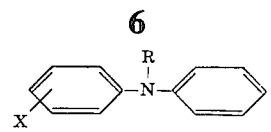

wherein X is selected from the group consisting of a hydrogen atom, a halogen atom, an alkyl group and a phenylamino group and wherein R is selected from the group consisting of a hydrogen atom and an alkyl group, and (b) the reaction product of diphenylamine and acetone, and at least one compound selected from the group consisting of benzoquinone and hydroquinone monomethyl ether, and (2) a gas selected from the group consisting of oxygen and an oxygen-containing gas.

9. In a process for the distilling of acrylic acid without polymerization comprising the steps of heating liquid acrylic acid at a top of the column temperature of from 39° to 95° C and a pressure of from 10 mm Hg to 150 mm Hg to form a vapor of acrylic acid, separating said vapor from said liquid, and condensing said vapor, the improvement which comprises distilling said acrylic acid in the presence of the combination of (1) a member selected from the group consisting of (a) a compound having the general formula:

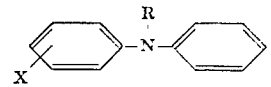

wherein X is selected from the group consisting of a hydrogen atom, a halogen atom, an alkyl group and a phenylamino group and wherein R is selected from the group consisting of a hydrogen atom and an alkyl group, and (b) the reaction product of diphenylamine and acetone, at a level of from 50 ppm to 5,000 ppm by weight based on the amount of liquid, and (2) a gas selected from the group consisting of oxygen and an oxygen-containing gas, said gas being present at a concentration such that the oxygen present ranges from 0.02 to 2 percent by volume to the vapor present.

10. The process of claim 1, wherein said alkyl groups are methyl groups.

11. The process of claim 1, wherein said compound of group (a) is selected from the group consisting of diphenylamine, N-methyl diphenyl amine, o-chlorophenyl-N-aniline, o-methylphenyl-N-aniline, diphenyl-paraphenylene diamine.

* * * * *